United States Patent [19]

Brown et al.

[11] 3,791,836

[45] Feb. 12, 1974

[54] LOW DENSITY MOLDING POWDER OF VERMICULITE AND CLAY

[75] Inventors: Patrick Michael Brown, Baltimore; Vernon Bruce May, Ellicott City, both of Md.

[73] Assignee: W. R. Grace & Co., New York, N.Y.

[22] Filed: Aug. 25, 1972

[21] Appl. No.: 283,896

[52] U.S. Cl. .................................. 106/71, 106/40 R
[51] Int. Cl. ..................... C04b 31/20, C04b 31/26
[58] Field of Search ............................ 106/40 R, 71

[56] References Cited
UNITED STATES PATENTS

| | | | |
|---|---|---|---|
| 2,526,073 | 10/1950 | Gardner | 106/40 R |
| 2,922,719 | 1/1960 | Robinson | 106/71 X |
| 3,030,218 | 4/1962 | Robinson | 106/71 |

OTHER PUBLICATIONS

Gitter, A. J. Recent Developments in the use of vermiculite in the ceramic field. In Refractories Journal 34 p. 435–439 (1958).

Primary Examiner—A. B. Curtis
Assistant Examiner—John F. Niebling
Attorney, Agent, or Firm—Joseph P. Nigon

[57] ABSTRACT

A process for the continuous preparation of a homogeneous lightweight molding powder comprised of clay, vermiculite, water, and, in some cases, an additive for further improving strength, in which the solid components are fed to a liquid-solids blender wherein the water can be added simultaneously.

9 Claims, No Drawings

LOW DENSITY MOLDING POWDER OF VERMICULITE AND CLAY

BACKGROUND OF THE INVENTION

The prior art processes for preparation of molding powders that include vermiculite and clay require multiple steps to obtain a product of satisfactory strength, due to the excessive compaction of the vermiculite by heretofore known mixing procedures. The prior processes require an additional step of initially adding water to the vermiculite. The added water fills the void within the vermiculite and helps to diminish its compaction during mixing.

U.S. Pat. No. 3,030,218 to Robinson describes such a process. In the Robinson process, vermiculite is mixed with water to achieve a water content of 0.5 to 2 pounds of water per pound of vermiculite. In the second step of the process, the ceramic mix is added to the wetted aggregate and mixing continued to produce a complete mixture of the desired consistency. The batch process described in the Robinson patent, however, is not entirely satisfactory in that excessive amounts of water and additional steps are required, while the product quality is poorer due to the mixing method. Processes of this type thus require substantially longer drying times to remove excess water, while molding powders thus prepared are more difficult to press due to sticking in the mold. These processes also cause greater drying shrinkage.

BRIEF DESCRIPTION OF THE INVENTION

We have found that by using liquid-solids blending apparatus, we are able to produce a superior molding powder by simultaneous addition of all of the components with as little as 10 to 15 weight percent water in the total system. The molding powder or composition prepared by the process of the present invention results in less shrinkage when used to prepare panels and other structures, while products prepared from the powder have consistently better strength. The use of the process results in less drying and stronger products with lower drying shrinkage while maintaining dimensional uniformity.

DETAILED DESCRIPTION OF THE INVENTION

The essence of the present invention is a continuous process by which a superior low density molding powder with a lower water content can be prepared. The final product typically contains on the order of 12 to 15 weight percent added water based on the total weight of the powder composition. In contrast, the prior art product contained on the order of 15 to 75 weight percent water in the molding powder. As explained previously, this additional water causes shrinkage problems in the drying step.

The starting material for our novel process is the vermiculite filler. The vermiculites are secondary minerals usually gold and yellow brown in color produced by the thermal expansion of micaceous vermiculite ore. When heated, water is driven off and exfoliation of the sheets causes the lamellae to open out into worm-like forms. The flakes can be expanded to 20 to 30 times their original length, normal to the talclike layers. The talclike layers of vermiculite are separated by double layers of water molecules. Almost half of the water is lost at 110° C. without exfoliation. The water which produces exfoliation is apparently more tightly bound and related to the pronounced base exchange capacity of the vermiculite. Most vermiculites are graded, prior to exfoliation, using a well known grading system corresponding to a particle size ranging from 0.1 to 2 centimeters.

Another essential component of our lightweight molding powder is the clay. The ceramic mix forming the matrix for the lightweight aggregate may be comprised of individual clays or combinations of clays. It is generally found that addition of plastic type clays (e.g., bentonite) results in improved forming qualities of the ultimately prepared molding powder, while addition of non-plastic clays (e.g., kaolin), although not as advantageous to the rheology of the ultimately prepared molding powder, results in better shrink-resistance. The clay used should initially be sufficiently dry to produce a free-flowing granular mass in order to be adapted to the mixing procedure of the present invention. Several clays have been found suitable for use as the ceramic mix either alone or in combination. These clays include (1) Pre-Cambrian shale, (2) alluvial clay, (3) Alabama coal measure clay, (4) South Carolina sedimentary kaolin, and (5) bentonite.

Any of the commercially available vermiculite materials may be employed in the practice of this invention. Vermiculites include the "No. 2" and "No. 5" varieties which are characterized by a density of 4 to 8 and 8 to 11 pounds per cubic foot respectively and a screen analysis (by weight) as shown in the accompanying Tables. The Nos. 1, 3, and 4 vermiculites have also been used depending on the desired physical properties of the final product.

Table I

| Sieve Size | Vermiculite No. 2 Max. | Min. |
|---|---|---|
| 4 | 5 | 0 |
| 8 | 80 | 20 |
| 16 | 99 | 75 |
| 30 | 100 | 90 |

Table II

| Sieve Size | Vermiculite No. 5 Max. | Min. |
|---|---|---|
| 16 | 0 | 0 |
| 30 | 10 | 0 |
| 50 | 50 | 10 |
| 100 | 85 | 55 |

The third essential component of our molding powder is water. The mixture is made up to contain from about 30 to about 70 parts by weight of vermiculite, preferably about 60 parts, and from about 30 to about 60 parts by weight of clay, preferably about 40 parts. The water is added so that the final water content in the mixture will be on the order of 12 to 22 weight percent, preferably from about 12 to about 18 weight percent based on the total weight of clay plus vermiculite.

If desired, agents for further improving strength may be added. Such agents include, for example, glass-forming flux and inorganic fibrous materials. Any suitable flux may be added with the essential vermiculite, clay, and water components. The flux may be added in any suitable manner. The form in which the flux is added may be, for example, either as a solid or dissolved in water. When used, the flux may be included in an amount of from about 0.01 to about 8 weight percent based on the total weight of the vermiculite plus clay components.

Preferred glass-forming fluxes are combinations of borax and sodium metaphosphate, preferably in a ratio of 2 parts by weight of borax or sodium borate ($Na_2B_4O_7 \cdot 10\ H_2O$) per 1 part by weight of sodium metaphosphate ($NaPO_3)_6$. Conveniently, borax-sodium metaphosphate flux may be added as a pre-mix or solution thereof with the essential water component. This flux may be included in an amount from about 0.01 to about 8 weight percent based on the total weight of the vermiculite plus clay components, and preferably from about 0.5 to about 3 weight percent on the same basis.

Other preferred glass-forming fluxes are glass frits. These fluxes may be added as solids, preferably in an amount of from about 1 to about 7 weight percent based on the total weight of the vermiculite plus clay components.

Inorganic fibrous materials, e.g., wollastonite, glass fibers, asbestos fibers, and the like, may be added in an amount of from about 1 to about 15 percent by weight based on the total weight of the vermiculite plus clay components. Molding powders prepared by the present process using, in combination, additions of from about 1 to about 15 weight percent of inorganic fibrous materials and from about 1 to about 7 weight percent of glass frit as a glass-forming flux, the additions being made as solids, have been found eminently suitable for molding high strength panels.

Additional materials may be added to provide final products having a wide variety of physical characteristics.

The mixing step of our process is critical. The mixing is carried out so that the components are uniformly dispersed with each other. Various types of mixing apparatus can be used so long as the apparatus blends the liquid and solid components simultaneously and with little or no compaction of the vermiculite. Very good results have been achieved using a commercially available Paterson-Kelly Liquids-Solids zig-zag blender equipped with a dispersion bar for feeding the water with or without a water soluble flux dissolved therein.

The components are blended in such blending apparatus preferably by simultaneously and continuously adding the various components with energization of the blender using addition rates of from about 2.5 to about 5.8 pounds per minute for the vermiculite and from about 2.5 to about 5.8 pounds per minute for the ceramic mixture or clay per 1 to 1.8 pounds per minute for the water, and preferably per 1 to 1.3 pounds per minute for the water. The residence time in the blender is normally from about 1 to about 2 minutes, and preferably from about 1 to about 1.6 minutes, e.g., about 1.5 minutes.

After mixing, the materials are recovered as an almost dry lightweight free flowing powder, which can be dry pressed by standard ceramic processing techniques into a wide variety of shapes. The minumum compaction pressure necessary to compress the granular material into a coherent mass appears to be about 20 pounds per square inch. The mixture should not be compacted beyond a dry density of about 95 pounds per cubic foot. A dry density in the range of 20 to 70 pounds per cubic foot is preferred.

After the lightweight powder is compressed into a coherent low density shape, the compacted mass is fired by heating at a temperature of about 1,700° F. to 2,250° F. for a period of about ½ to 8 hours, and preferably at about 1,825° F. to 1,850° F. for a period of about 2 hours.

Our invention is illustrated by the following specific, but nonlimiting examples:

EXAMPLE I

No. 4 vermiculite having a density of 6 to 7 pounds per cubic foot, bentonite clay having a density of 48.2 to 48.4 pounds per cubic foot, and water having a density of 62.43 pounds per cubic foot were simultaneously fed at a total feed rate of 8.12 pounds per minute to an energized 8 inch zig-zag blender commercially available from Paterson-Kelly Company.

The vermiculite was fed at a feed rate of 4.20 pounds per minute and the bentonite at a rate of 2.80 pounds per minute. The water was fed through the dispersion bar of the blender at a rate of 1.12 pounds per minute with rotation of the bar at a speed of 1,700 revolutions per minute. Thus the water was added in an amount of about 16 percent by weight based on the total weight of the vermiculite plus clay components. The residence time in the blender was 1.53 minutes. The bulk density of the thus prepared molding powder was 10.5 to 12.5 pounds per cubic foot. A panel was prepared from this material using a commercially available press operated at a pressure of 200 pounds per square inch. After removal, the panel was fired for 2 hours at a temperature of 1,830° F. The final density of the panel was 55 pounds per cubic foot. The panel had a flexural strength of 690 pounds per square inch.

EXAMPLE II

This example illustrates the process of our invention wherein a flux is added with the water.

No. 4 vermiculite having a density of 6 to 7 pounds per cubic foot, bentonite clay having a density of 48.2 to 48.4 pounds per cubic foot, and water containing 0.056 pound of a 2:1 mixture of sodium borate-sodium metaphosphate flux per pound of water were simultaneously added to an energized 12 inch production model zig-zag blender commercially available from the Paterson-Kelly Company.

The vermiculite was fed at a rate of 14 pounds per minute and the bentonite clay at a rate of 9.32 pounds per minute. The water-flux solution was fed through the dispersion bar at a rate of 3.73 pounds per minute. Thus the flux was added in an amount of about 0.8 to 0.9 weight percent and the water was added in an amount of about 15.1 weight percent, based on the total weight of vermiculite plus clay. The residence time in the blender was 1.53 minutes. The thus prepared powder had a bulk density of 10.5 to 12.5 pounds per cubic foot. A panel was pressed from the powder using a commercially available press operated at a pressure of 200 pounds per square inch. After removal, the panel was fired for 2 hours at a temperature of 1,830° F. The fired panel had a density of 55 pounds per cubic foot and a flexural strength of 780 pounds per square inch.

EXAMPLE III

This example illustrates the preparation of a molding powder using No. 5 vermiculite.

A molding powder was prepared using the same components as in Example II except that all the No. 4 vermiculite was replaced by No. 5 vermiculite. The feed rates, the blender, and the residence time were the same as in Example II. The powder had a bulk density of 13 to 15 pounds per cubic foot. A panel was pressed from this material in a conventional press at a pressure of 200 pounds per square inch. The panel was fired at 1,830° F. for 2 hours. The fired panel had a density of 60 pounds per cubic foot and a flexural strength of 980 pounds per cubic foot.

EXAMPLE IV

This example illustrates the effect of varying the residence time in the blending apparatus.

No. 4 vermiculite having a density of 6 to 7 pounds per cubic foot, bentonite clay having a density of 48.2 to 48.4 pounds per cubic foot and water having a density of about 62.4 pounds per cubic foot were simultaneously and continuously added to an 8-inch zig-zag blender as in Example I except that the total feed rate was reduced to 5.33 pounds per minute. The vermiculite was fed at a rate of 2.76 pounds per minute, the bentonite at a rate of 1.84 pounds per minute, and the water at a rate of 0.73 pounds per minute. The blender used was that of Example I except that the dispersion bar was modified with an 8 blade extension. Rotation of the modified bar was at 3,000 revolutions per minute. The blender was operated to increase the residence time in the blender to 2.1 minutes.

The final powder had a bulk density of 14 to 16 pounds per cubic foot. A panel was pressed using conditions that resulted in the panel having a density of 55 pounds per cubic foot. After being fired at a temperature of 1,830° F. for 2 hours, the panel had a flexural strength of 550 pounds per square inch.

EXAMPLE V

This example illustrates an embodiment process of the present invention which further includes adding an inorganic fibrous material and a glass-forming flux as solid feed streams.

A total of 1,730 pounds of No. 4 vermiculite, 870 pounds of bentonite clay, 289 pounds of wollastonite as the inorganic fibrous material, and 162 pounds of glass frit P-3P-17P (Pemco Company) as the glass-forming flux were continuously and simultaneously fed to an energized 12 inch zig-zag blender commercially available from the Paterson-Kelly Company while a total of 464 pounds of water was continuously and simultaneously fed to the blender through the dispersion bar. Thus, per 100 parts by weight of vermiculite plus clay, there were added 66.5 parts by weight of vermiculite, 33.5 parts by weight of clay, about 17.8 percent by weight of water, about 11 percent by weight of wollastonite, and about 6.3 percent by weight of frit. The average residence or mixing time in the blender was from about 1 to about 2 minutes.

The bulk density of the thus prepared molding powder was 12.9 pounds per cubic foot. A panel was prepared from this powder using a commercially available press operated at a pressure of about 200 pounds per square inch. After firing the panel by heating at a temperature of 1,860° F. for 6 hours, the density of the panel was 59.9 pounds per cubic foot and the flexural strength of the panel was 847 pounds per square inch. The fired panel had a pentration hardness of 121 pounds as measured by the force required to indent the panel to a depth of 0.050 inches with a ¼ inch steel ball.

After glazing the fired panel, the flexural strength was 1,144 pounds per square inch and the penetration hardness was 195 pounds.

The above examples establish forming molding powders having a bulk density of from 10.5 to 16 pounds per cubic foot.

It is to be understood that the foregoing detailed description is given merely by way of illustration and that various modifications may be made therein without departing from the spirit or scope of the present invention.

What is claimed is:

1. A process for preparing a lightweight molding powder consisting essentially of from about 30 to about 70 parts by weight of vermiculite, from about 30 to about 70 parts by weight of clay, and from about 12 to about 22 weight percent added water based on the total weight of the vermiculite plus clay, which comprises simultaneously and continuously blending the components in apparatus adapted to blend liquids and solids where said components are simultaneously and continuously added to said apparatus at addition rates of from about 2.5 to about 5.8 pounds per minute for vermiculite and from about 2.5 to about 5.8 pounds per minute for the clay per 1 to 1.8 pounds per minute for the water, the total addition rate corresponding to a residence time in the blending apparatus of from about 1 to about 2 minutes, the amounts of said vermiculite, clay, and water being so selected to obtain a molding powder having a bulk density of from about 10.5 to about 16 pounds per cubic foot.

2. The process according to claim 1 wherein the vermiculite is number 2, 3, 4, or 5 vermiculite and the clay is bentonite.

3. The process according to claim 1 wherein the composition consists of about 60 parts by weight of vermiculite and about 40 parts by weight of clay, said composition containing from about 12 to about 18 weight percent added water based on the total weight of the vermiculite plus clay.

4. The process according to claim 1 which further includes adding a glass-forming flux in an amount of from about 0.01 to about 8 weight percent of the total weight of vermiculite plus clay.

5. The process according to claim 4 wherein the flux is a borax-sodium metaphosphate flux.

6. The process according to claim 5 wherein the flux contains 2 parts of borax per part of sodium metaphosphate.

7. The process according to claim 4 wherein the glass-forming flux is a glass frit added in an amount from about 1 to about 7 weight percent based on the total weight of vermiculite plus clay.

8. The process according to claim 1 which further includes adding an inorganic fibrous material in an amount of from about 1 to about 15 weight percent based on the total weight of vermiculite plus clay.

9. The process according to claim 8 which further includes adding a glass-forming flux in an amount from about 1 to about 7 weight percent based on the total weight of vermiculite plus clay, and wherein the fibrous material and the flux are added as solids.

* * * * *